March 28, 1944.   J. M. ROTH ET AL   2,345,547
TANK VALVE ASSEMBLY
Filed Feb. 9, 1942   2 Sheets-Sheet 1
Fig. 1
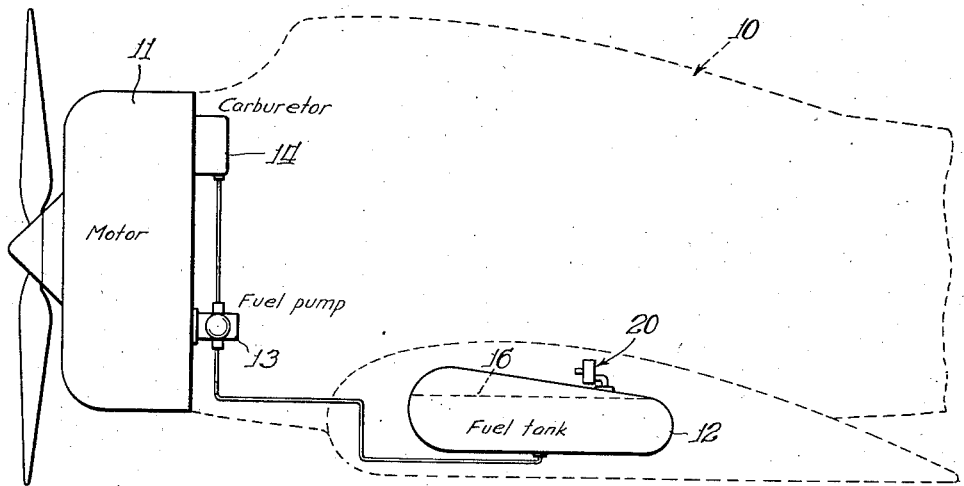
Fig. 4
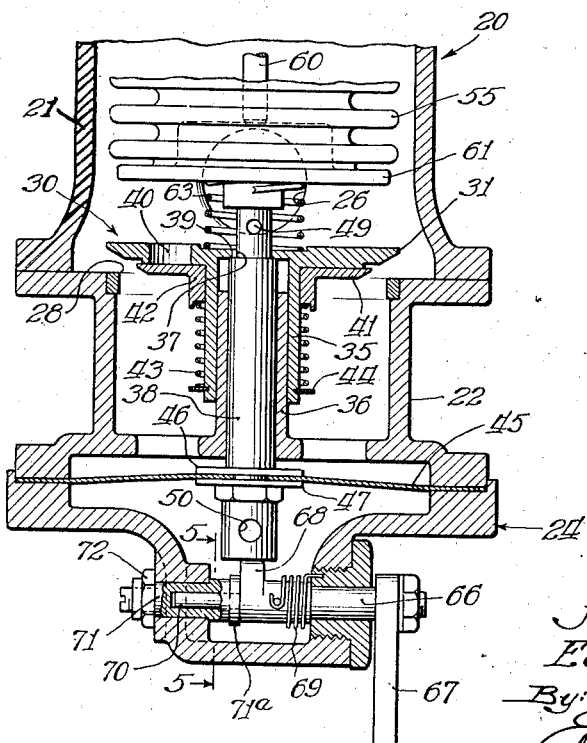
Fig. 5
Inventors:
Jay M. Roth and
Edmund F. Wichorek
By Edward C. Gritzbaugh
Atty.

March 28, 1944.  J. M. ROTH ET AL  2,345,547
TANK VALVE ASSEMBLY
Filed Feb. 9, 1942  2 Sheets-Sheet 2

Inventors:
Jay M. Roth and
Edmund F. Wichorek
By:
Edward C. Gritzbaugh
Atty.

Patented Mar. 28, 1944

2,345,547

UNITED STATES PATENT OFFICE 2,345,547

TANK VALVE ASSEMBLY

Jay M. Roth, Euclid, and Edmund F. Wichorek, Cleveland, Ohio, assignors to Pesco Products Co., Cleveland, Ohio, a corporation of Ohio Application February 9, 1942, Serial No. 429,982

8 Claims. (Cl. 137—144)

This invention relates to arrangements for controlling the pressure above the fuel level in aircraft fuel tanks.

The problem of controlling the conditions in aircraft fuel tanks including particularly the proper control of the pressure above the surface of the fuel has become increasingly important with the extended use of higher octane more volatile fuels. Certain major factors prevail, including the increasing tendency on the part of the fuel to boil as relatively high altitudes are approached, due to the decreasing surrounding atmospheric pressure; the necessity for controlling the maximum pressure permissible within the tank; as well as the necessity for controlling the minimum pressure or vacuum permissible within the tank. Due also to other causes incident to aircraft operation, such for example as diving, climbing, and other maneuvering of the craft, the conditions of pressure or vacuum within the fuel tank often change quite rapidly and special provision must be made therefor.

It is therefore an object of this invention to provide a new arrangement of means for effecting the proper control of the pressure in aircraft fuel tanks which arrangement takes into consideration all of the above and other factors incident to the operation of aircraft.

It is a more particular object to provide an improved arrangement of the above type which is automatically operable in accordance with the existing conditions of flight including the altitude at which the craft is flying, thus eliminating the necessity for close observation on the part of the pilot and freeing his attention for other duties.

It is a still further detailed object to provide and disclose a specific arrangement of structure forming a preferred embodiment of the invention.

Other and more particular objects, advantages and uses of the present invention will become apparent from a reading of the following specification taken in connection with the accompanying drawings which form a part hereof and wherein:

Fig. 1 is a schematic view showing the essential relationship of elements on an aircraft incorporating the present invention;

Fig. 4 is a cross-section view similar to that of Fig. 2 but showing the vent valve assembly held in open position by the manual control member; and Fig. 5 is a cross-section view taken substantially on the lines 5—5 of Fig. 4.

Figure 2:
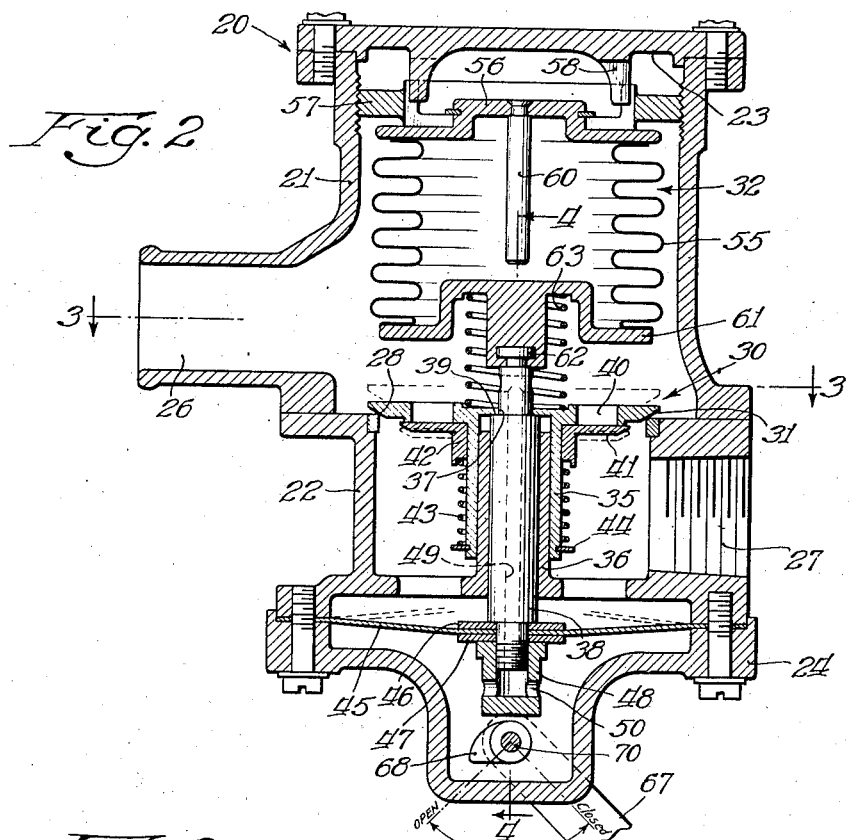
Fig. 2 is a generally coaxial cross section view of a preferred embodiment of the invention.
Figure 3:
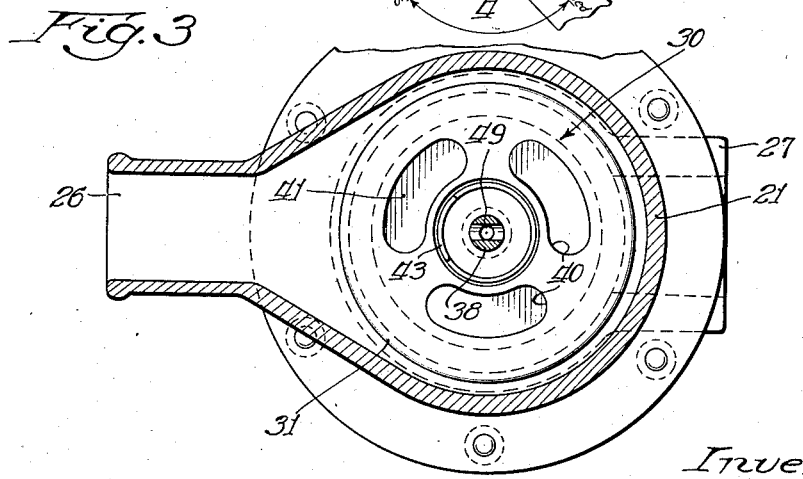
Fig. 3 is a cross-section view taken substantially on the line 3—3 of Fig. 2.

Referring in greater detail to the figures of the drawings, numeral 10 indicates schematically an airplane including a motor 11, a fuel supply tank 12, a fuel pump 13 and a carburetor 14, all arranged in a conventional manner. The fuel level line in tank 12 is indicated at 16 and it is to the control of the pressure in the space above the liquid in the tank that the present invention is particularly directed. For this purpose we have provided a special vent valve assembly indicated generally at 20 in Fig. 1 and shown in greater detail in the remaining figures of the drawings.

This vent valve arrangement 20 includes an enclosing housing which preferably comprises an upper automatic control assembly housing 21 mounted on a lower valve housing proper 22, the former being closed by end closure 23 while the latter is closed by end closure 24. A first port 26 places the upper housing 21 in communication with the atmosphere while a second port 27 is arranged to connect the lower housing section 22 with the space in tank 12 above the liquid level 16. Horizontal valve seat 28 is provided in the upper portion of housing section 22 and faces generally in the direction of atmospheric port 26. For the purpose of controlling communication between the ports 26 and 27 past seat 28 there is provided a special vent valve assembly proper indicated generally at 30 and including an excess tank pressure responsive valve 31 automatically or manually brought into engagement with seat 28 under certain conditions to be pointed out.

For the purpose of moving vent valve assembly 30 into and out of engagement with seat 28 automatically in accordance with the altitude at which the aircraft is flying, there is provided a differential pressure responsive bellows assembly indicated generally at 32, to be described in detail later.

First describing vent valve assembly 30 in detail, valve proper 31 is disc-like in form and includes a depending tubular portion 35 arranged to embrace in guided relation an upstanding tubular protuberance 36 formed as a part of housing 22, valve 31 being formed with a central coaxial opening 37 for cooperation with a valve stem 38 also journalled within protuberance 36 and having a shoulder 39 cooperating with valve 31 about the periphery of opening 37 for lifting the valve when the stem 38 is raised but permitting free movement of valve 31 in guided relation to stem 38 under other conditions to be described.

An auxiliary vent valve sub-assembly is provided in conjunction with valve 31 and includes the formation of ports 40 in face of valve 31. Cooperating with the underside of these ports is a second disc-like valve 41 having a depending neck portion 42 guidably received about depending portion 35 of valve 31, disc-valve 41 being urged in the closing direction by means of a compression coil spring 43 having one end portion engaging the extremity of neck 42 and being confined in embracing relation about the tubular protuberance 35 by means of split compression retaining ring 44. Valve stem 38 is fastened to the central portion of a flexible diaphragm 45 through the medium of washers 46 and 47 confined thereagainst by nut 48, the periphery of the diaphragm being clamped between lower housing section 22 and closure member 24. In order to place the space between closure member 24 and diaphragm 45 in communication with the pressure in housing section 21 the stem 38 is formed with bore 49 and nut 48 is similarly provided with a communicating orifice 50. The result of this arrangement is to balance out the effects of atmospheric pressure on valve assembly 30 and render the same solely responsive when in closed position, to the condition of pressure or vacuum existing within tank 12. The exact relative areas of valve 30 and diaphragm 45 required in order to give this balanced relationship may be quickly determined by readily available engineering procedure. Roughly, diaphragm 45 must have three times the area of the valve 30, since the diaphragm is clamped to the housing at the periphery thereof, and therefore any forces acting thereon are partially absorbed by the housing leaving only the remainder of the force to act on the diaphragm.

Connected with the upper opposite end of valve stem 38 for effecting the automatic movement of valve assembly 30 into and out of engagement with seat 28 in accordance with the particular altitude at which the associated plane is being flown, there is provided the above referred to altitude responsive device indicated generally at 32. This device 32 includes a collapsible bellows 55 the upper end of which is closed by an end plate 56 supported in upper housing 21 from an adjustable threaded ring 57 in turn locked in any particular adjusted position by means of depending protuberances 58 depending from closure member 23 of the upper housing section. Stop pin extends from closure plate 56 and functions to limit the movement in a bellows collapsing direction of a second closure plate 61 associated with the opposite end of bellows 55. The lower closure plate 61 is shown connected to valve stem 38 by a dovetail arrangement indicated at 62. Interposed between the adjacent faces of valve 31 and closure plate 61 is a coil compression spring 63 which normally functions to maintain valve 31 against the shoulder 39 on valve stem 38.

Particular attention is drawn to the fact that bellows 55 is evacuated to a predetermined degree corresponding to the pressure existing at a selected altitude, a satisfactory example being that at 14,000 feet above sea level. The bellows is given this degree of evacuation with the assembly in the position shown in Fig. 2 with vent valve assembly 30 in the closed position. With the arrangement described, a change in altitude below the 14,000 feet will expose the exterior of the bellows to a pressure which is relatively greater than the predetermined pressure therein and hence the bellows will contract and withdraw vent valve assembly 30 upwardly thus raising valve 31 from seat 28 and exposing tank 12 to atmospheric pressure. On the other hand, a return to 14,000 feet or above will result in the extension of bellows 55 to bring valve assembly 30 into engagement with seat 28 and maintain this relationship under normal conditions of flight, this being due to the fact that the pressure within the bellows becomes increasingly greater in relation to the surrounding atmospheric pressure.

Among the advantages of closing valve assembly 30 upon reaching a critical altitude is the fact that by thus shutting off the area above the fuel in the tank from the surrounding atmosphere the tendency of the fuel to boil at such relatively high altitudes is taken advantage of to introduce in effect self-supercharging. In other words, the increased vapor pressure functions in a manner very similar to actually supercharging the tank.

By providing the above described lost motion guided connection between stem 38 and valve 31 including shoulder 39, it will be seen that any predetermined excess pressure occurring within tank 12 will be effective to raise the entire valve assembly 30 notwithstanding the fact that the plane may be above the critical altitude where the bellows assembly is in the lowered or extended position normally corresponding to the closed position of the valve. Thus a predetermined difference in pressure may be maintained between that in the tank and the surrounding atmosphere depending upon the adjustment of the compression of spring 63 and irrespective of wide changes in the surrounding atmospheric pressure due to the aircraft changing altitudes.

Likewise the occurrence of a predetermined critical vacuum within the tank 12, which may be caused for example by a dive, will result in the opening of auxiliary vacuum responsive valve 41 to provide communication between the tank and the surrounding atmosphere to thus prevent collapse of the tank wall.

Under certain conditions it may be desirable to lock vent valve assembly 30 in the open position thereof, and to this end there is provided a manually operable cam mechanism indicated generally at 65. This mechanism includes the shaft 66 under control of manual lever 67 which may be operated from a remote point by linkage mechanism not shown. Cam 68 carried by shaft 66 engages retainer nut 48 upon arcuate adjustment of manual lever 67 for moving valve assembly 30 out of engagement with its seat, cam 68 being urged in the retracted direction by means of a torque coil spring 69. A reduced portion 70 of shaft 66 is journalled in a spacer member 71 mounted in coaxial alignment with shaft 66 and fastened to closure member 24 by nut assembly 72. It will be noted that spacer member 71 includes an eccentric cam 71a and by suitable adjustment of this eccentric it is possible to limit the downward movement of stem 38 to the desired extent, this eccentric cam 71a being locked in any particular chosen arcuate position by means of nut 72.

While we have disclosed our invention in connection with a specific embodiment thereof, this is intended to be by way of example rather than by way of limitation, and the invention is to be defined by the appended claims which should be given a scope as broad as permitted by the prior art.

We claim:

1. In a vent valve arrangement for an aircraft fuel tank, means defining a housing having a first port for communication with the interior of said fuel tank, a second port for communication with the surrounding atmosphere, and a valve seat in said housing facing in the general direction of said second port, means defining a valve assembly including a valve for cooperation with said seat for controlling the communication between said ports, and means responsive to changes in atmospheric pressure accompanying predetermined changes in altitude effective to move said last named valve means to opened or closed position, said means including a resilient connection, whereby excess pressure within said tank may be effective to open said valve to place said tank in communication with the atmosphere through said second port upon the occurrence of excess pressure therein notwithstanding the fact that said atmospheric pressure responsive means has moved said valve into closed position.

2. In a vent valve arrangement for an aircraft fuel tank, means defining an enclosing housing having a first port for communicating with the interior of said fuel tank, a second port in communication with the surrounding atmosphere, and means defining a valve seat within said housing facing in the general direction of said second port, means defining a valve assembly within said housing including a disc-like valve for cooperation with said seat, and means responsive to changes in atmospheric pressure accompanying predetermined changes in altitude effective to move said last named valve means between opened and closed positions, said pressure responsive means comprising a bellows assembly including a first end wall adjustably supported from said housing, a second end wall closing the opposite end of said bellows, said bellows being given a predetermined degree of evacuation corresponding in pressure to the atmospheric pressure existing at a selected altitude, means limiting the movement of said second end wall in the direction of said first end wall for controlling the extent of collapse of said bellows, and a coil compression spring interposed between said valve assembly and said second end wall whereby the occurrence of a predetermined excess pressure within said tank is effective to open said valve assembly notwithstanding the fact that the associated aircraft may be flying at an altitude at which said bellows has expanded and moved said valve assembly to closed position.

3. In a vent valve assembly for an aircraft fuel tank, means defining an enclosing valve housing having a first port for communication with the interior of said fuel tank, a second port for communication with the surrounding atmosphere, a valve seat in said housing between said ports facing in the general direction of said second port, means defining a valve assembly including a disc-like valve for cooperation with said seat, said valve having a depending tubular guide portion, an opening formed through the central portion of said valve, a valve stem having one end portion received in said opening for relative guided movement therebetween, said stem having an enlarged cylindrical portion forming a shoulder for cooperation with said valve about the periphery of said opening to limit the extent of relative movement therebetween, a tubular guide protuberance extending in a coaxial direction in the general central portion of said housing and received between said tubular depending portions of said valve and said stem for guidably supporting the same, a flexible diaphragm connected about the periphery thereof with the surrounding housing and having the lower end portion of said valve stem connected centrally therewith, means placing the outer side of said diaphragm in communication with the atmosphere whereby to balance out the effects of atmospheric pressure upon said valve assembly and render the same operable when in position in engagement with said valve seat in response only to the pressure within said tank, and means responsive to changes in atmospheric pressure accompanying predetermined changes in altitude effective to move said valve means between open and closed position, said means including a coil compression spring connection, whereby excess pressure within said tank may open said valve to place said tank in communication with the atmospheric pressure upon the occurrence of excess pressure therein notwithstanding the fact that said atmospheric means is in valve closed position.

4. In a vent valve assembly for an aircraft fuel tank, means defining an enclosing valve housing having a first port for communication with the interior of said fuel tank, a second port for communication with the surrounding atmosphere, a valve seat in said housing between said ports facing in the general direction of said second port, means defining a valve assembly including a disc-like valve for cooperation with said seat, said valve having a depending tubular guide portion, an opening formed through the central portion of said valve, a valve stem having one end portion received in said opening for relative guided movement therebetween, said stem having an enlarged cylindrical portion forming a shoulder for cooperation with said valve about the periphery of said opening to limit the extent of relative movement therebetween, a tubular guide protuberance extending in a coaxial direction in the general central portion of said housing and received between said tubular depending portions of said valve and said stem for guidably supporting the same, a flexible diaphragm connected about the periphery thereof with the surrounding housing and having the lower end portion of said valve stem connected centrally therewith, means placing the outer side of said diaphragm in communication with the atmosphere whereby to balance out the effects of atmospheric pressure upon said valve assembly and render the same operable when in position in engagement with said valve seat in response only to the pressure within said tank, and means responsive to changes in atmospheric pressure accompanying predetermined changes in altitude effective to move said valve means between open and closed position, said pressure responsive means comprising a bellows assembly including a first end wall adjustably supported from said housing, a second end wall closing the opposite end of said bellows, said bellows being given a predetermined degree of evacuation corresponding in pressure to the atmospheric pressure existing at a selected altitude, means limiting the movement of said second end wall in the direction of said first end wall for controlling the extent of collapse of said bellows, and a coil compression spring interposed between said valve assembly and said second end wall whereby the occurrence of a predetermined excess pressure within said tank is effective to open said valve assembly notwithstanding the fact that the associated aircraft may be flying at an altitude at which said bellows has expanded and moved said valve assembly to closed position.

5. In a vent valve arrangement for an aircraft fuel tank, means defining a housing having a first port for communication with the interior of said fuel tank, a second port for communication with the surrounding atmosphere, and a valve seat in said housing facing in the general direction of said second port, means defining a valve assembly including a valve for cooperation with said seat for controlling the communication between said ports, means responsive to changes in atmospheric pressure accompanying predetermined changes in altitude effective to move said last named valve means to opened or closed position, said means including a resilient connection, whereby excess pressure within said tank may be effective to open said valve to place said tank in communication with the atmosphere through said second port upon the occurrence of excess pressure therein notwithstanding the fact that said atmospheric pressure responsive means has moved said valve into closed position, and manually operable cam means for moving said valve assembly to open position and retaining the same in said open position.

6. In a vent valve assembly for an aircraft fuel tank, means defining an enclosing valve housing having a first port for communication with the interior of said fuel tank, a second port for communication with the surrounding atmosphere, a valve seat in said housing between said ports facing in the general direction of said second port, means defining a valve assembly including a disc-like valve for cooperation with said seat, said valve having a depending tubular guide portion, an opening formed through the central portion of said valve, a valve stem having one end portion received in said opening for relative guided movement therebetween, said stem having an enlarged cylindrical portion forming a shoulder for cooperation with said valve about the periphery of said opening to limit the extent of relative movement therebetween, a tubular guide protuberance extending in a coaxial direction in the general central portion of said housing and received between said tubular depending portions of said valve and said stem for guidably supporting the same, said disc-like valve being formed with ports therethrough, an auxiliary disc-like valve normally closing said ports from the tank side of said first disc-like valve, said auxiliary valve being centrally orificed and received in embraced guided relation about said depending tubular guide portion of said first valve, a coil compression spring embracing said depending tubular guide portion and engaging said auxiliary valve for normally urging the same toward closed position, said auxiliary valve being opened in response to the occurrence of a predetermined vacuum in said tank to place the same in communication with the outside atmosphere, a flexible diaphragm connected about the periphery thereof with the surrounding housing and having the lower end portion of said valve stem connected centrally therewith, means placing the outer side of said diaphragm in communication with the atmosphere whereby to balance out the effects of atmospheric pressure upon said valve assembly and render the same operable when in position in engagement with said valve seat in response only to the pressure within said tank, and means responsive to changes in atmospheric pressure accompanying predetermined changes in altitude effective to move said valve means between open and closed position, said means including a coil compression spring connection, whereby excess pressure within said tank may open said valve to place said tank in communication with the atmospheric pressure upon the occurrence of excess pressure therein notwithstanding the fact that said atmospheric means is in valve closed position.

7. In a vent valve assembly for controlling the pressure above the fuel in an aircraft fuel tank at varying altitudes, means defining a housing containing a valve chamber having a first port adapted to place the same in communication with the interior of said fuel tank, a second port adapted to place the same in communication with the surrounding atmosphere, a valve seat in said housing separating said ports and facing in the general direction of said second port, a valve for cooperation with said valve seat for controlling the communication between said ports and means responsive to predetermined changes in the surrounding atmospheric pressure accompanying changes in altitude effective to move said valve to open or to closed position, said means including a resilient lost motion connection to said valve in the closing direction of operation whereby the occurrence of a predetermined excessive pressure within said tank when said valve is in closed position will be effective to open said valve without causing a corresponding movement of said atmospheric pressure responsive means, said means further including a positive connection with said valve for positively moving the same from closed to open position upon the occurrence of a predetermined rise in the surrounding atmospheric pressure accompanying a decrease in altitude.

8. In a vent valve assembly for controlling the pressure above the liquid level in an aircraft fuel tank at varying altitudes, means defining a valve housing including a valve chamber, a first port adapted to place said valve chamber in communication with the interior of said fuel tank, a second port adapted to place said valve chamber in communication with the surrounding atmosphere, a valve seat in said housing facing in the general direction of said second port, means defining a valve assembly including a disc-like valve for cooperation with said seat to control the communication between said first and second ports, additional port-defining means formed in said disc-like valve, an additional disc-like valve means arranged to normally close said additional port-defining means, a spring for normally urging said additional valve into closed position and means responsive to predetermined changes in the surrounding atmospheric pressure accompanying changes in altitude effective to move said first named valve to open or to closed position, said means including positive connecting means with said valve in the opening direction and a lost motion resilient connecting means in the closing direction, a predetermined decrease in the surrounding atmospheric pressure accompanying increase in altitude being effective to cause the closing of said first named disc-like valve into engagement with said seat thus shutting off the communication between the tank and the atmosphere, said resilient connection being effective to permit the relief from said tank of any excess pressure from said tank occurring therein due to changes in flying conditions while said second named disc-like valve means is operable against said associated spring in response to the occurrence of a predetermined reduction of pressure within said tank while said first named valve is in closed position to vent said tank to the atmosphere and thus prevent collapse thereof.

JAY M. ROTH.
EDMUND F. WICHOREK.